United States Patent

[11] 3,607,592

[72] Inventor Peter J. Jenkins
        Burscough, England
[21] Appl. No. 886,416
[22] Filed Dec. 18, 1969
[45] Patented Sept. 21, 1971
[73] Assignee Dunlop Rubber Company Limited
        London, England
[32] Priority Oct. 31, 1964
[33]  Great Britain
[31]  44507/64
     Continuation of application Ser. No.
     505,503, Oct. 28, 1965, now abandoned.

[54] PORTABLE PLATFORMS
     5 Claims, 1 Drawing Fig.
[52] U.S. Cl. .................................................. 161/57,
                    14/1, 161/78, 161/92, 161/144
[51] Int. Cl. ....................................................... B32b 5/12,
                                                              B32b 25/10
[50] Field of Search............................................ 14/13, 27,
     70, 73, 1; 74/232, 237; 108/51-58; 156/137, 138,
     180, 181; 161/55, 57-60, 78, 159-161, 175, 92,
     140-144, 168; 198/190, 193; 214/1

[56]            References Cited
            UNITED STATES PATENTS
3,144,930  8/1964  Michels ........................ 198/193
3,297,513  1/1967  Robinson ..................... 161/57
            FOREIGN PATENTS
  902,200  7/1962  Great Britain................ 161/57

Primary Examiner—William A. Powell
Attorney—Stevens, Davis, Miller & Mosher

ABSTRACT: Portable platform for use, for example, as a temporary road, comprising a flexible plastic material in which is embedded a composite reinforcement comprising two layers of parallel transverse metal cords and sandwiched between the two layers a layer of textile reinforcement and a layer of longitudinal parallel metal cords, the layer of longitudinal cords lying between the textile reinforcement and the load-bearing surface of the platform so that "one way" longitudinal rigidity is achieved.

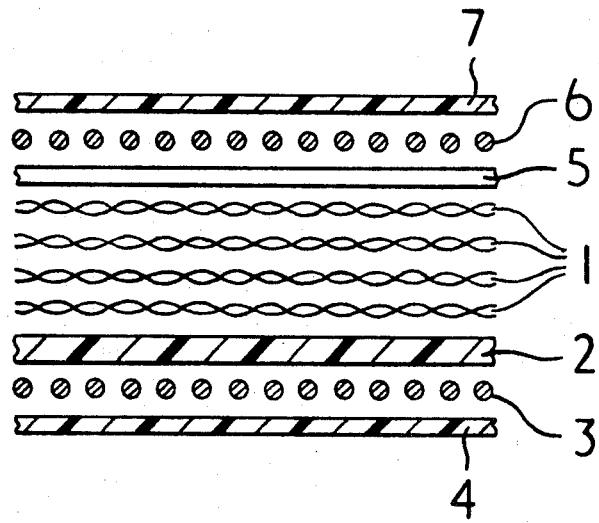

PORTABLE PLATFORMS

This application is a continuation of application Ser. No. 505,503 filed Oct. 28, 1965 and now abandoned.

This invention relates to portable platforms suitable for use as, for example, temporary bridges, catwalks and other walkways, and temporary roads on unfirm ground or swamps.

According to the present invention a portable platform comprises a flexible composition having embedded therein a composite reinforcement comprising a textile reinforcement together with at least two layers of individually flexible transverse substantially inextensible metal cords, the metal cords in each layer lying substantially parallel with each other and substantially at right angles to the length of the platform, the separation of the transverse metal-cord layers being sufficient to confer a substantial degree of transverse rigidity upon the platform as a whole, and an interposed textile constituent of the composite reinforcement being disposed between each transverse metal-cord layer and the adjoining transverse metal-cord layer.

According to one aspect of the present invention, a portable platform as described above has a composite reinforcement including a layer of longitudinal substantially inextensible metal cords lying substantially parallel with each other and with the length of the platform, said layer of longitudinal metal cords being disposed between an interposed textile constituent of the composite reinforcement and the layer of transverse metal cords which lies closest to the load-bearing surface of the platform.

The longitudinal metal cords may be either continuous or discontinuous. When they are discontinuous they may be in parallel, overlapping relationship with each other. The discontinuous metal cords may be of any convenient lengths.

Usually the metal cords are steel cords. The steel cords preferably have a percentage extensibility of less than 5 percent. Suitable cords are composed of intertwisted strands of steel wire; for example the cords may be composed of from six to 24 strands of steel wire of about 0.001 to 0.010 inch diameter. The cords are normally arranged in close side-by-side relationship and may suitably be arranged at a density of from eight to 24 cords per inch.

Preferably the composite reinforcement consists of two layers of transverse steel cords with a single layer of textile reinforcement between them and a layer of longitudinal steel cords disposed between the textile layer and the layer of transverse steel cords which lies closer to the load-bearing surface of the platform.

A filler layer of the flexible composition may be disposed next to the textile layer, preferably on the side distant from the load-bearing surface of the platform. The thickness of the filler layer may be varied in order to vary the separation of the metal-cord layers.

The flexible composition may be a vulcanized natural and/or synthetic rubber composition or a synthetic resin composition, for example a plasticized polyvinyl chloride composition.

Each layer of metal cords may be prepared, for example, by plating the cords (e.g. by zinc plating) and arranging the plated cords in parallel side-by-side relationship and applying a vulcanizable flexible bonding composition such as a natural rubber composition containing a minor proportion of a cobalt salt such as cobalt linoleate or cobalt naphthenate over and between the cords by a process of cold calendering. The layer of rubber-coated cords may then be included in the construction of the platform.

The textile reinforcement may consist of one or more plies of textile material in woven or weftless arrangement. The textile material may be composed of cords of a natural or synthetic fiber, for example cotton, polyamide, polyethylene terephthalate, polyolefine, regenerated cellulose or polynosic fibers.

A portable platform as described above may be held under tension between suitable anchorage means. The anchorage means will vary according to the particular use of the platform. Anchorage may be achieved by use of fasteners conventionally used to connect lengths of belting. For example each end of the platform may be provided with a metal plate having transversely perforated castellations which extend outwardly in the plane of the platform. Each castellated metal plate may be mated with a castellated anchorage plate having cooperating castellations. A tiepin may be inserted through the aligned transverse perforations of the two sets of castellations to effect a joint. By way of further example, each end of the platform may be provided with a castellated end similar to those described with reference to segmental conveyor belts, in our copending United Kingdom application Nos. 41109/62, 35914/63 and 32816/64. Such a castellated end comprises ferrules each of which is enclosed by cords the ends of which extend a short distance into the platform and enclose or are enclosed by the ends of the reinforcement layers, said ferrules being arranged in transversely aligned relationship. The castellated end may be mated with a castellated anchorage plate in the manner described above.

If desired the platform may be manufactured in segments, and the segments joined together by belt fastening means such as those described above. For example two segments having castellated ends may be mated and joined by use of a tiepin.

The present invention provides a portable platform which can be erected simply by applying moderate tension e.g. about 50–80 pounds per inch from supports at the ends. The platform has remarkable transverse rigidity, so that sagging of the edges does not occur to any undesirable extent when a person or vehicle stands on or moves along the platform with weight acting at the edges of the platform, and so that twisting of the platform is limited. The platform may be rolled up and transported in convenient rolls.

In addition the layer of longitudinal metal cords above the textile reinforcement gives longitudinal rigidity with respect to loads acting down upon the load-bearing surface of the platform.

Continuous longitudinal metal cords also add to the tensile strength of the platform whereas when discontinuous longitudinal metal cords are used, though they give longitudinal rigidity to the platform, the tensile strength is then provided solely by the textile reinforcement. Because of the substantially inextensible nature of the metal cords, longitudinal sagging cannot occur even when the metal cords are discontinuous unless the textile reinforcement below the discontinuous longitudinal metal cords stretches appreciably which requires considerable force. Nevertheless the platform may be easily rolled up with the load-bearing surface outermost in the roll because bending of the platform in this direction merely requires circumferential compression of the textile reinforcement below the inextensible metal cords.

These properties are most advantageous in uses such as bridging water where the platform may be floated on small pontoons, the longitudinal rigidity of the platform limiting sag between the support points. In swampy or sandy terrain the platform may be used in place of "duck boards" to give support to vehicles, equipment, and personnel. The portable platform in accordance with this invention is much more easily transported and much less liable to serious damage than conventional duck boards.

If the platform is not required to be rolled up for transportation, a further layer or layers of longitudinal cords may be provided below the textile reinforcement.

One embodiment of the present invention will now be described by way of example only and with reference to the drawing.

The textile reinforcement 1 of the platform was made up of four plies of cotton fabric frictioned with a vulcanizable natural rubber composition. A filler layer 2 of vulcanizable rubber composition of the order of 0.25–0.35 inch thick was applied on the under surface of the textile reinforcement.

Substantially inextensible steel cords (2×3×0.0086-inch steel wire zinc-plated) were laid in side-by-side relationship at a frequency of 20 cords per inch. A vulcanizable rubber composition containing a minor proportion of cobalt linoleate was applied over and between the cords by cold calendering.

A ply of rubberized steel cords 3 was laid on the under surface of the filler layer with the steel cords extending transversely across the platform. A cover layer 4 of rubber composition was applied below the transverse steel cord layer.

A ply of rubberized steel cords 5 was laid on the upper surface of the textile reinforcement 1, the steel cords extending parallel to the longitudinal axis of the platform and covering the whole surface area of the platform. Above this longitudinal steel cord layer, a ply of rubberized steel cords 6 was laid with the steel cords extending transversely across the platform at right angles to the cords in the ply below. The platform was completed with a top cover 7 of vulcanizable rubber composition. The assembled platform was vulcanized.

The top cover could be moulded with a flat surface, which can be a roughened surface, or a surface ribbed in either longitudinal or transverse direction.

What is claimed is:

1. A portable platform comprising a length of flexible polymeric material having a load-supporting surface, and including a composite reinforcement embedded in the polymeric material to provide a substantial degree of transverse rigidity, a substantial degree of longitudinal rigidity in a first direction movement to said load-supporting surface, and a degree of longitudinal flexibility with loading in a direction opposite to said first direction to permit rolling up of said platform, said composite reinforcement comprising, in sequence:

a top cover forming said load-supporting surface;

a first transverse layer of substantially inextensible rubberized metallic cords, said cords extending parallel to each other and transversely of the belt;

a longitudinal layer of substantially inextensible rubberized metallic cords extending parallel to each other and longitudinally of the platform;

a layer comprising a plurality of textile plies embedded in flexible polymeric material;

a filler layer of flexible polymeric material;

a second transverse layer of substantially inextensible rubberized metallic cords, said cords extending parallel to each other and transversely of the platform; and a bottom cover layer of flexible polymeric material;

said first and second layers of cords, extending transversely of the platform, spaced apart to provide said substantial degree of transverse rigidity, said layer of cords extending longitudinally of the platform and said layer of textile plies positioned relative to each other to provide said degree of substantial longitudinal rigidity in one direction, said textile plies providing said degree of longitudinal flexibility in said opposite direction.

2. A platform according to claim 1 wherein the metal cords are steel cords.

3. A platform according to claim 1 wherein the polymeric material is a vulcanized natural or synthetic rubber composition.

4. A platform according to claim 1 wherein the polymeric material is a synthetic resin composition.

5. A platform according to claim 4 wherein the synthetic resin composition is a plasticized polyvinyl chloride composition.